US008638885B2

(12) United States Patent
Evseev et al.

(10) Patent No.: US 8,638,885 B2
(45) Date of Patent: Jan. 28, 2014

(54) SPACE-TIME DECODER AND METHODS FOR DECODING ALAMOUTI-ENCODED SIGNALS IN HIGH-DOPPLER ENVIRONMENTS

(75) Inventors: Grigory Sergeevich Evseev, Saint-Petersburg (RU); Ilya Vladimirovich Katsov, Saint-Petersburg (RU); Andrey Vladimirovich Belogolovy, Saint Petersburg (RU); Andrey Gennadievich Efimov, St. Petersburg (RU); Vladislav Alekseevich Chernyshev, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 12/514,840

(22) PCT Filed: Nov. 14, 2006
(Under 37 CFR 1.47)

(86) PCT No.: PCT/RU2006/000600
§ 371 (c)(1),
(2), (4) Date: Feb. 28, 2011

(87) PCT Pub. No.: WO2008/060177
PCT Pub. Date: May 22, 2008

(65) Prior Publication Data
US 2012/0128104 A1  May 24, 2012

(51) Int. Cl.
*H04L 27/06* (2006.01)
(52) U.S. Cl.
USPC .......................................... 375/341; 375/265

(58) Field of Classification Search
USPC ................................................. 375/265, 341
See application file for complete search history.

(56) References Cited

U.S. PATENT DOCUMENTS 6,771,722 B2 *  8/2004  Diehl et al. ................. 375/346
2006/0256794 A1 * 11/2006  Rezaiifar et al. ........... 370/394

FOREIGN PATENT DOCUMENTS

| CN | ZL200680056369.8 | 11/2012 |
| KR | 19990036012 | 5/1999 |
| KR | 101107362 B1 | 1/2012 |
| WO | WO-9705709 A1 | 2/1997 |
| WO | WO-9914871 A1 | 3/1999 |
| WO | WO-2008060177 A1 | 5/2008 |

OTHER PUBLICATIONS

"Japanese Application Serial No. 200680056369.8, Non Final Office Action dated May 25, 2011", and English translation, 16 pgs.
"Korean Application Serial No. 10-2009-7009791, Response filed May 6, 2011 to Non Final Office Action mailed Jan. 5, 2011", 14 pgs.

(Continued)

*Primary Examiner* — Kevin Kim
(74) *Attorney, Agent, or Firm* — Schwegman, Lundberg & Woessner, P.A.

(57) ABSTRACT

Embodiments of a space-time decoder and methods for decoding Alamouti-encoded signals in high-Doppler environments are generally described herein. Other embodiments may be described and claimed. In some embodiments, soft-symbol outputs are generated from received symbols, a channel rate-of-change, and channel coefficients. Maximum-likelihood decoding may be performed to generate hard-symbol outputs from the soft-symbol outputs.

20 Claims, 3 Drawing Sheets

SPACE-TIME DECODER

(56) References Cited

OTHER PUBLICATIONS

Bhargava, V. K, et al., "Improved Approximate Maximum-Likelihood Receiver for Differential Space-Time Block Codes Over Rayleigh-Fading Channels", *IEEE Transactions on Vehicular Rechnology*, 53(2), (Mar. 2004), 461-468.

Heath Jr., R. W, et al., "Receiver Designs for Alamouti coded OFDM Systems in Fast Fading Channels", *IEEE Transactions on Wireless Communications*, 4(2), (Mar. 25), 550-559.

Jootar, J., et al., "Performance of Alamouti space-time code in time-varying channels with noisy channel estimates", *IEEE Wilreless Communications and Networking Conference*, (Mar. 13, 2005 to Mar. 17, 2005), 498-503.

Tarokh, V., et al., "New Detection Schemes for Transmit Diversity with No Channel Estimation", *Universal Personal Communications*, 2(5), (Oct. 5, 1998 to Oct. 9, 1998), 917-920.

Teo, K. A, et al., "Kalman Filter-Bassed Channel Estimation for Space-Time Block Code", *Ieee Curcuits and Systems*, (Jul. 25, 2004 to Jul. 28, 2004), II-669 to II-672.

Weilin, L., et al., "Adaptive Channel Equalization for high-speed train", *IEEE Vehicular Technology Conference*, (Jun. 8, 1994 to Jun. 10, 1994), 225-229.

"Korean Application Serial No. 10-2009-7009791, Office Action mailed Jan. 5, 2011" (with English translation), 5 pgs.

Teo, Kok Ann Donny, et al., "Kalman filter-based Channel Estimation for Space-Time block Code", The 47th IEEE International Midwest Symposium on Circuits and Systems, (2004), 669-672.

"European Application Serial No. 06849624.9, Office Action mailed Jun. 10, 2010", 4 pgs.

Jootar, J., et al., "Performance of Alamouti space-time code in time-varying channels with noisy channel estimates", IEEE Wireless Communications and Networking Conference, 2005, vol. 1, (2005), 498-503.

"Chinese Application Serial No. 200680056369.8, Office Action mailed Mar. 7, 2012", 8 pgs.

"Japanese Application Serial No. 2009-536190, Office Action mailed Feb. 21, 2012", 4 pgs.

Kenji, Ito, et al., "Inter-Vehicle Communication Scheme Based on MIMO-STBC for Propagation Environment in Intersection without Line-of-Sight", The Institute of Electronics, Information and Communication Engineers Technical Report, A P, Antenna and Transmission 105 (355), (Oct. 13, 2005), 139-144.

\* cited by examiner

SPACE-TIME DECODER AND METHODS FOR DECODING ALAMOUTI-ENCODED SIGNALS IN HIGH-DOPPLER ENVIRONMENTS

This application is a U.S. National Stage Filing under 35 U.S.C. 371 from International Application No. PCT/RU2006/000600, filed Nov. 14, 2006 and published in English as WO 2008/060177 on May 22, 2008, which application and publication are incorporated herein by reference in their entireties.

TECHNICAL FIELD

Some embodiments of the present invention pertain to wireless communication systems. Some embodiments of the present invention pertain to decoding Alamouti-encoded signals transmitted by more than one antenna in high-Doppler environments.

BACKGROUND

Some conventional transmitters transmit specially encoded signals using two or more antennas to improve the ability of a receiver to process these signals. For example, in some multiple-input multiple-output (MIMO) systems, Alamouti-encoded signals generated by a space-time encoder are transmitted to help increase decoding gain and reduce bit-error-rate (BER) at the receiver. In mobile environments, the transmitter and/or the receiver may be moving, causing the received symbols to be distorted by Doppler-shift. This distortion may reduce the receiver's decoding gain and may significantly degrade the receiver's BER, particularly at high signal-to-noise (SNR) levels.

Thus, there are general needs for receivers and methods for decoding received signals that may be distorted due to Doppler-shift. What are also needed are space-time decoders and methods that increase decoding gain in environments with high-Doppler shift.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
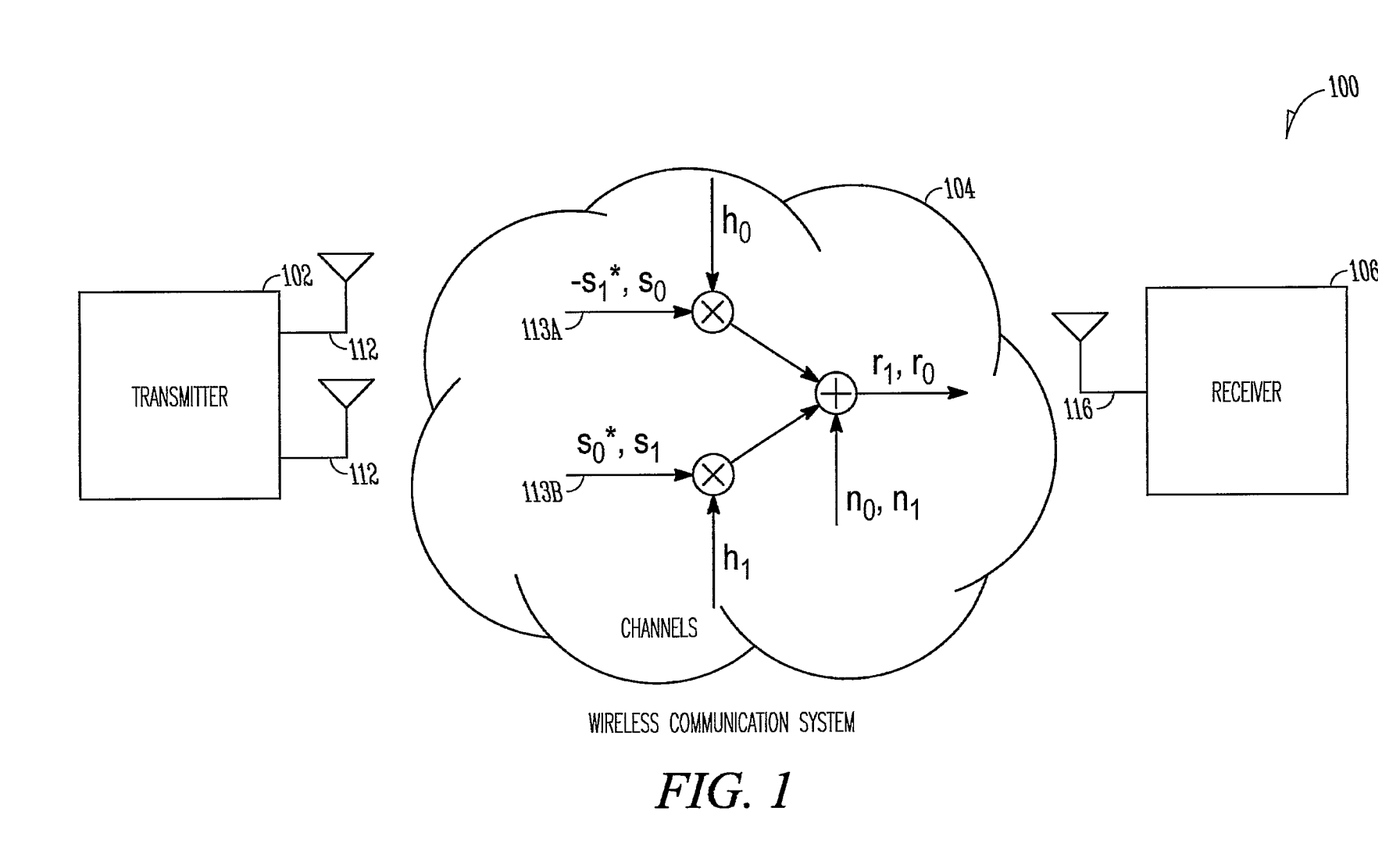
FIG. 1 illustrates a wireless communication system in accordance with some embodiments of the present invention.

FIG. 1 illustrates a wireless communication system in accordance with some embodiments of the present invention. Wireless communication system 100 may include transmitter 102 and receiver 106. Transmitter 102 may transmit radio-frequency (RF) signals using two or more antennas 112 through channel 104 for receipt by receiver 106. Receiver 106 may use one or more antennas 116 to receive RF signals from transmitter 102 through channel 104.

In accordance with some MIMO embodiments, transmitter 102 may transmit encoded pairs of symbols ($\alpha_0$, $\alpha_1$) using two antennas 112. In some embodiments, transmitter 102 may encode symbols ($\alpha_0$, $\alpha_1$) in accordance with the following transmission matrix:

$$G(\alpha_0, \alpha_1) = \begin{pmatrix} \alpha_0 & \alpha_1 \\ -\alpha_1^* & \alpha_0^* \end{pmatrix} \quad (1)$$

which may correspond to an Alamouti-encoded transmission of symbols ($\alpha_0$, $\alpha_1$). Symbols $\alpha_0$, $\alpha_1$ may comprise complex numbers that denote the amplitude and phase of input bits that were either amplitude or phase modulated at transmitter 102. As illustrated by this transmission matrix, at a first instant in time, a first transmit antenna may transmit symbol $\alpha_0$ while a second transmit antenna may transmit symbol $\alpha_1$. At a second instant in time, the first transmit antenna may transmit symbol $-\alpha_1^*$ while the second transmit antenna may transmit symbol $\alpha_0^*$, in which * refers to a complex conjugate. These encoded symbols may be generated by a space-time block encoder within transmitter 102. This technique transmits multiple copies of a data stream using two or more antennas 112 to exploit the various received versions of the data to improve reliability of data transfer. This may result, for example, in an increase in decoding gain and/or a lower bit-error-rate (BER) at receiver 106.

In embodiments that use two transmit antennas 112 and one receive antenna 116, channel 104 may comprise two channels (shown as channels 113A and 113B) between transmitter 102 and receiver 106. Each channel may have different channel characteristics, which may be represented by channel coefficients ($h_0$, $h_1$) which describe the channel transfer functions of channel 104. As illustrated in channel 104, first channel 113A having channel coefficient $h_0$ may affect symbols $-s_1^*$ and $s_0$ transmitted by a first of transmit antennas 112, and second channel 113B having channel coefficient $h_1$ may affect symbols $s_0^*$ and $s_1$ transmitted by a second of transmit antennas 112. Transmitted symbols $s_0$ and $s_1$ may correspond to symbols $\alpha_0$ and $\alpha 1$ respectively of the transmission matrix illustrated above. As further illustrated, signals from channel 113A and 113B combine in channel 104 and are affected by noise, illustrated as $n_0$ and $n_1$, resulting in signals that may be received by receiver 106, illustrated as received symbols $r_0$, $r_1$. Received symbols $r_0$ and $r_1$ may comprise complex numbers or values that are a result of the integration of the signals received by receiver 106. Received symbols $r_0$ and $r_1$ are actually generated within receiver 106 from the RF signals received through antenna 116, but are shown for illustrative purposes in FIG. 1 within channel 104.

In a situation with no Doppler shift (i.e., a constant channel), the received symbols $r_0$ and $r_1$ may be represented by the following equations:

$$R_0 = h_0\alpha_0 + h_1\alpha_1 + n_0$$

$$R_1 = h_0\alpha_1^* + h_1\alpha_0^* + n_1 \quad (2)$$

In these equations, $R_0$ and $R_1$ correspond respectively to received symbols $r_0$ and $r_1$ at first and second instances in time, $\alpha_0$ and $\alpha_1$ represent the transmitted signals of the transmission matrix, $h_0$ and $h_1$ represent the channel coefficients for channels 113A and 113B respectively, and $n_0$ and $n_1$ represent average-white Gaussian noise (AWGN) components at the first and second instances in time. In a conventional receiver, a decoder may estimate the transmitted symbols $\alpha_0$ and $\alpha_1$ in accordance with following equations, without taking noise into account:

$$\beta_0 = h_0^* R_0 + h_1 R_1^* = (|h_0|^2 + |h_1|^2) \cdot \alpha_0$$

$$\beta_1 = h_1^* R_0 - h_0 R_1^* = (|h_0|^2 + |h_1|^2) \cdot \alpha_1 \quad (3)$$

In these equations, $\beta_0$ and $\beta_1$ represent output decisions from a conventional decoder. In a high-Doppler environment where either the transmitter or the receiver is moving, the received symbols may be distorted due to the time-varying nature of channel 104. High-Doppler shift may result from situations in which transmitter 102 and/or receiver 106 are moving in a vehicle, such as a car or train (e.g., moving less than 300 kilometers per hour). This distortion may be represented by the following equations:

$$R_0 = h_0 \alpha_0 + h_1 \alpha_1 + n_0$$

$$R_1 = -h_0(1+\delta_0)\alpha_1^* + h_1(1+\delta_1^*)\alpha_0^* + n_1 \quad (4)$$

In these equations, $\delta_0$ represents the channel rate-of-change for channel 113A and $\delta_1$ represents the channel rate-of-change for channel 113B. In some embodiments, a channel estimator within receiver 106 may calculate channel rate-of-change $\delta_0$ and $\delta_1$ from channel coefficients that are measured at different times. These embodiments are described in more detail below.

In a conventional receiver, the output of an Alamouti decoder may be represented as:

$$\beta_0 = h_0^* R_0 + h_1 R_1^* = h_0^* (h_0 \alpha_0 - h_1 \alpha_1 \delta_0^*) + h_1 h_1^* x_0 (1+\delta_1^*)$$

$$\beta_1 = h_1^* R_0 - h_0 R_1^* = h_1^* (h_1 \alpha_1 - h_0 \alpha_0 \delta_1^*) + h_0 h_0^* x_1 (1+\delta_0^*) \quad (5)$$

These values may also be represented by the following equations:

$$\beta_0 = h_0^* R_0 + h_1 R_1^* = (|h_0|^2 + |h_1|^2) \cdot \alpha_0 + h_1 h_1^* \alpha_0 \delta_1 - h_1 h_0^* \alpha_1 \delta_1^*$$

$$\beta_1 = h_1^* R_0 + h_1 R_1^* = (|h_0|^2 + |h_1|^2) \cdot \alpha_1 + h_0 h_0^* \alpha_1 \delta_0 - h_0 h_1^* \alpha_0 \delta_0^* \quad (6)$$

These equations illustrate that $\beta_0$ and $\beta_1$ are distorted due to the channel rate-of-change $\delta_0$ and $\delta_1$ in comparison with Alamouti decoder output in a constant channel case described previously in Equations (3).

In accordance with some embodiments of the present invention, receiver 106 may include a space-time decoder that may compensate for the distortion of a time-varying channel due to high-Doppler shift. In these embodiments, receiver 106 generates soft-symbol outputs $v_0$ and $v_1$ from the received symbols $r_0$ and $r_1$, the channel rate-of-change $\delta_0$ and $\delta_1$ and the channel coefficients $h_0$ and $h_1$. These embodiments are discussed in more detail. In some embodiments, the space-time decoder may perform maximum-likelihood decoding to generate hard-symbol outputs $x_0$ and $x_1$ from the soft-symbol outputs $v_0$ and v1. In some embodiments, hard-symbol outputs $x_0$ and $x_1$ may be generated from the soft-symbol outputs $v_0$ and $v_1$ by detecting points in the signal constellation with the minimal Euclidian distance to the soft-symbol outputs $v_0$ and v1. These embodiments are also discussed in more detail below.

In some embodiments, receiver 106 may also generate revised soft-symbol outputs $\theta_0$ and $\theta_1$ from the initial hard-symbol outputs $x_0$ and $x_1$, the received symbols $r_0$, $r_1$, the channel rate-of-change $\delta_0$ and $\delta_1$ and the channel coefficients $h_0$, $h_1$. In these embodiments, final hard-symbol outputs $x_0$ and $x_1$ may be generated by performing maximum-likelihood decoding on the revised soft-symbol outputs $\theta_0$ and $\theta_1$. These embodiments are also discussed in more detail below. The channel rate-of-change $\delta_0$ and $\delta_1$ may be used to compensate, at least in part, for distortion in channel 104 caused by high-Doppler shift. In these embodiments, the final hard-symbol outputs $x_0$ and $x_1$ generated by maximum-likelihood decoding may be estimates of Alamouti-encoded symbols $\alpha_0$ and $\alpha_1$ transmitted by transmitter 102. In some embodiments, the generation of revised soft-symbol outputs $\theta_0$ and $\theta_1$ and interim hard-symbol outputs may be iteratively performed to generate the final hard-symbol outputs $x_0$ and $x_1$, although the scope of the invention is not limited in this respect.

Soft-symbol outputs $v_0$ and $v_1$ (as well as revised soft-symbol outputs $\theta_0$ and $\theta_1$) may represent points in the complex plane corresponding to transmitted symbols $\alpha_0$ and $\alpha_1$, respectively. Hard-symbol outputs $x_0$ and $x_1$ may represent points of the signal constellation with the minimal Euclidian distance to the corresponding soft-symbol outputs $v_0$ and v1. When transmitter 102 uses binary phase-shift keying (BPSK) modulation, the further demodulation may not be necessary because hard-symbol outputs $x_0$ and $x_1$ may comprise the hard-bit outputs, and soft-symbol outputs $v_0$ and $v_1$ may comprise the soft-bit outputs. In some non-BPSK embodiments, hard-symbol outputs $x_0$ and $x_1$ may be further demodulated within receiver 106 to generate hard-bit outputs, and soft-symbol outputs $v_0$ and $v_1$ may be further demodulated within receiver 106 to generate soft-bit outputs. In these non-BPSK embodiments, transmitter 102 may modulate symbols with higher modulation levels, such as quadrature phase-shift keying (QPSK) and 8-PSK, or quadrature amplitude modulation (QAM), such as 16-QAM or 64-QAM, although the scope of the invention is not limited in this respect.

Figure 2:
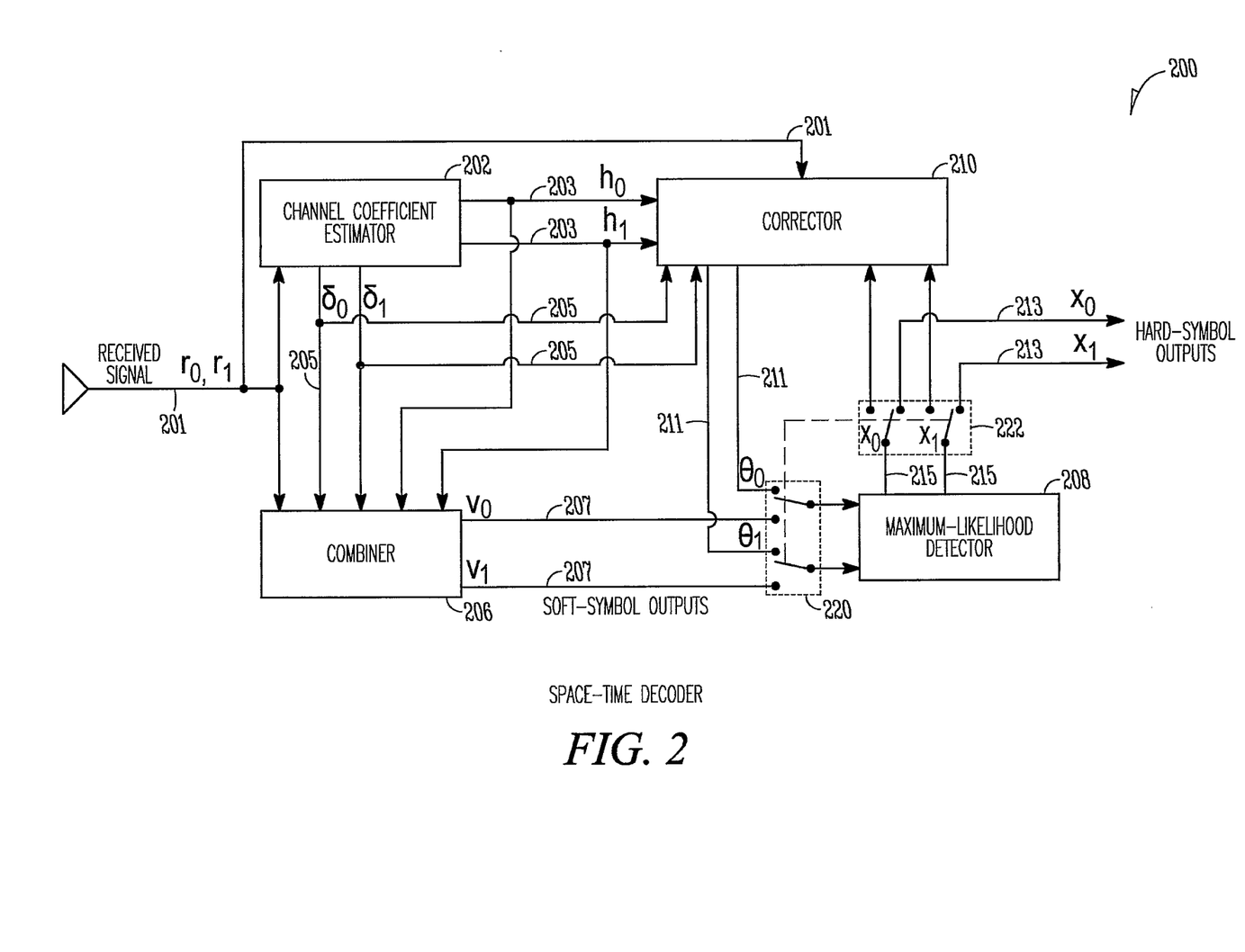
FIG. 2 is a block diagram of a space-time decoder in accordance with some embodiments of the present invention.

FIG. 2 is a block diagram of a space-time decoder in accordance with some embodiments of the present invention. Space-time decoder 200 may be suitable for use in receiver 106 (FIG. 1) and may compensate for distortion of a time-varying channel due to high-Doppler shift.

In some embodiments, space-time decoder 200 comprises combiner 206 to generate soft-symbol outputs ($v_0$, $v_1$) 207 from received symbols ($r_0$, $r_1$) 201, channel rate-of-change ($\delta_0$, $\delta_1$) 205 and channel coefficients ($h_0$, $h_1$) 203. Space-time decoder 200 may also comprise maximum-likelihood detector 208 to perform maximum-likelihood decoding to generate hard-symbol outputs ($x_0$, $x_1$) 213 from soft-symbol outputs ($v_0$, $v_1$) 207.

In some embodiments, hard-symbol outputs ($x_0$, $x_1$) 215 may be initial hard-symbol outputs. In these embodiments, space-time decoder 200 may further comprise corrector 210 for generating revised soft-symbol outputs ($\theta_0$, $\theta_1$) 211 from initial hard-symbol outputs ($x_0$, $x_1$) 215, received symbols ($r_0$, $r_1$) 201, channel rate-of-change ($\delta_0$, $\delta_1$) 205 and channel coefficients ($h_0$, $h_1$) 203. In these embodiments, maximum-likelihood detector 208 may generate final hard-symbol outputs ($x_0$, $x_1$) 213 by performing maximum-likelihood decoding on revised soft-symbol outputs ($\theta_0$, $\theta_1$) 211.

In these embodiments, received symbols ($r_0$, $r_1$) 201 may comprise Alamouti-encoded symbols (e.g., symbol pairs $s_0$, $s_1$) transmitted by two or more transmit antennas, such as transmit antennas 112 (FIG. 1). Combiner 206 and corrector 210 may apply channel rate-of-change ($\delta_0$, $\delta_1$) 205 to, at least in part, compensate for distortion in channel 104 (FIG. 1)

caused by high-Doppler shift, although the scope of the invention is not limited in this respect. In these embodiments, final hard-symbol outputs ($x_0$, $x_1$) 213 generated by maximum-likelihood detector 208 are estimates of the transmitted Alamouti-encoded symbols ($\alpha_0$, $\alpha_1$) discussed above.

In some embodiments, space-time decoder 200 may also include channel coefficient estimator 202 to calculate channel coefficients ($h_0$, $h_1$) 203 based on training signals transmitted through channel 113A (FIG. 1) and channel 113B (FIG. 1). In some embodiments, channel coefficient estimator 202 may also calculate channel rate-of-change ($\delta_0$, $\delta_1$) 205 from two or more sets of channel coefficients 203. In some embodiments, training signals may be transmitted separately (at different times) by each of transmit antennas 112 (FIG. 1) allowing channel coefficient estimator 202 to separately determine the channel coefficients 203 for channel 113A (FIG. 1) and channel 113B (FIG. 1).

In some embodiments, corrector 210 generates revised soft-symbol outputs ($\theta_0$, $\theta_1$) 211 and maximum-likelihood detector 208 generates interim hard-symbol outputs 215 iteratively (i.e., one or more times) before generating final hard-symbol outputs ($x_0$, $x_1$) 213, although the scope of the invention is not limited in this respect. In some embodiments, a single iteration may be sufficient.

In some embodiments, space-time decoder 200 may also include switching circuitry 220 to switch the inputs of maximum-likelihood detector 208 from the outputs of combiner 206 to the outputs of the corrector 210. Space-time decoder 200 may also include switching circuitry 222 to switch the outputs of maximum-likelihood detector 208 to inputs of corrector 210 when corrector 210 generates revised soft-symbol outputs 211 and maximum-likelihood detector 208 generates interim hard-symbol outputs 215.

In accordance with some embodiments, received symbols ($r_0$, $r_1$) 201 may comprise non-equalized received symbols. In these embodiments, received symbols ($r_0$, $r_1$) 201 may be processed by combiner 206 without a prior application of channel coefficients. Accordingly, in these embodiments, a channel equalizer is not necessary.

In some embodiments, combiner 206 may generate soft-symbol outputs ($v_0$, $v_1$) 207 based substantially on the following equations:

$$v_0 = \frac{(R_1^* h_1 + R_0 h_0^*(1 + \delta_0^*))}{h_0 h_0^*(1 + \delta_0^*) + h_1 h_1^*(1 + \delta_1^*)} \quad (7)$$

$$v_1 = \frac{(R_1^* h_0 - R_0 h_1^*(1 + \delta_1^*))}{h_0 h_0^*(1 + \delta_0^*) + h_1 h_1^*(1 + \delta_1^*)}$$

These equations may compensate, at least in part, for Doppler-induced distortion. In these equations, $r_0$ represents a symbol received at a first instance in time, $r_1$ represents a symbol received at a second instance in time, $h_0$ represents a channel coefficient for channel 113A (FIG. 1), $h_1$ represents a channel coefficient for channel 113B (FIG. 1), $\delta_0$ represents a rate-of-change for channel 113A (FIG. 1), $\delta_1$ represents a rate-of-change for the channel 113B (FIG. 1), and * represents the complex conjugate. In Equations (7), the denominator is a complex scaling coefficient that may be used to scale the amplitude and phase of the received symbols.

In some embodiments, additional processing may be performed. In these embodiments, the decisions represented by soft-symbol outputs ($v_0$, $v_1$) 207 may be further improved for high-Doppler environments. In these embodiments, corrector 210 may generate revised soft-symbol outputs ($\theta_0$, $\theta_1$) 211 based substantially on the following equations:

$$\theta_0 = \quad (8)$$
$$\frac{(R_1^* h_1 + R_0 h_0^*)(h_0 h_0^* + h_1 h_1^* + h_0 h_0^* \delta_0^*) - R_0 h_1 h_1^* h_0^* \delta_0^* \delta_1^*}{h_0 h_0^*(1 + \delta_0^*) + h_1 h_1^*(1 + \delta_1^*)} + \breve{x}_1 h_1 h_0^* \delta_0^*$$

$$\theta_1 = \frac{(-R_1^* h_0 + R_0 h_1^*)(h_0 h_0^* + h_1 h_1^* + h_1 h_1^* \delta_1^*) - R_0 h_0 h_0^* h_1^* \delta_0^* \delta_1^*}{h_0 h_0^*(1 + \delta_0^*) + h_1 h_1^*(1 + \delta_1^*)} +$$

$$\breve{x}_0 h_0 h_1^* \delta_1^*$$

In these equations, $\breve{x}_i$ represents interim outputs of maximum-likelihood detector 208 based on soft-symbol outputs $v_i$. Based on the values of revised soft-symbol outputs ($\theta_0$, $\theta_1$) 211, maximum-likelihood detector 208 may generate final decisions as hard-symbol outputs 213.

In some embodiments, to increase the decoder efficiency, the interim outputs $\breve{x}_i$ and the revised soft-symbol outputs $\theta^i$ may be recalculated as illustrated by the following equations:

$$\breve{x}_0 \leftarrow \text{MLDecoding}(\theta_0)$$

$$\breve{x}_1 \leftarrow \text{MLDecoding}(\theta_1) \quad (9)$$

In these embodiments, revised soft decisions illustrated as revised soft-symbol outputs $\theta_0$ and $\theta_1$ may be calculated in accordance with Equations (8). This process may be repeated several times, although the scope of the invention is not limited in this respect. In example embodiments that use BPSK modulation on a channel with a Rayleigh distribution, for a complex channel rate-of-change ($\delta_i$) and a normal distribution for the real and imaginary parts with variance of about 0.25, a significant BER reduction may be achieved over that of standard Alamouti decoding, although the scope of the invention is not limited in this respect.

In some embodiments that communicate orthogonal frequency division multiplexed (OFDM) signals, receiver 106 may also include Fourier transform circuitry to generate frequency domain signals corresponding to received symbols 201 from time-domain signals received by antenna 116 (FIG. 1). In these embodiments, receiver 106 may also include error correction circuitry, such as a forward error correcting (FEC) decoder, to perform error-correcting decoding on hard-bit outputs and/or soft-bit outputs, although the scope of the invention is not limited in this respect. In some embodiments, hard-bit outputs and soft-bit outputs may be generated by demodulating hard-symbol outputs 213 and soft-symbol outputs 207, respectively. Receiver 106 (FIG. 1) may also have other functional elements that may be part of its physical layer circuitry to generate a decoded bit stream corresponding to transmitted symbols not separately illustrated.

Although space-time decoder 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of space-time decoder 200 may refer to one or more processes operating on one or more processing elements.

Figure 3:
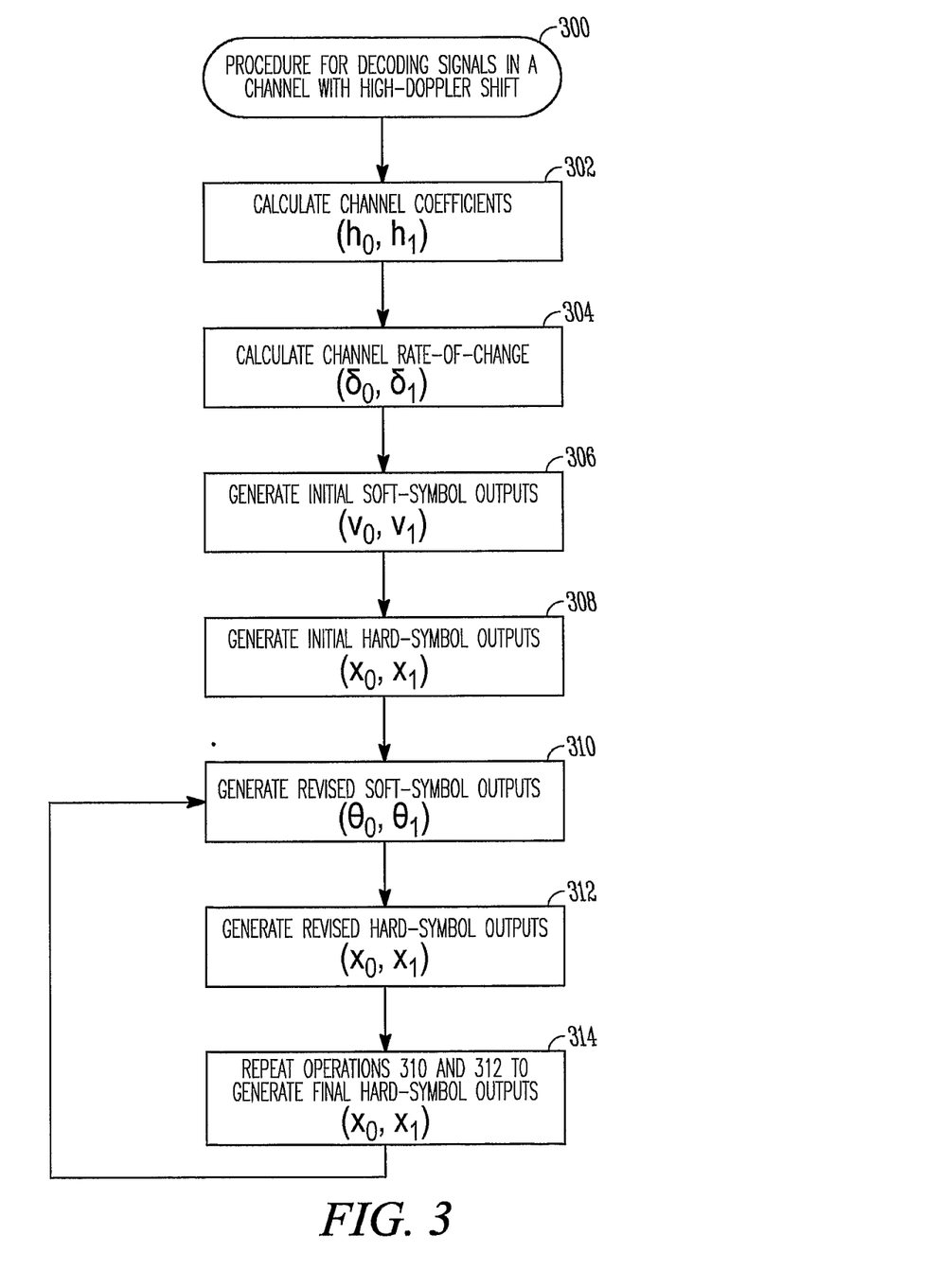
FIG. 3 is a flow chart of a procedure for decoding signals in a channel with high-Doppler shift in accordance with some embodiments of the present invention.

FIG. 3 is a flow chart of a procedure for decoding signals in a channel with high-Doppler shift in accordance with some embodiments of the present invention. Procedure 300 may be performed by a space-time decoder, such as space-time decoder 200 (FIG. 1), although other decoder configurations may also be suitable. Although procedure 300 is applicable for decoding signals in a channel with high-Doppler shift, procedure 300 is also applicable for decoding signals with little or no Doppler shift.

In operation 302, channel coefficients ($h_0$, $h_1$) are calculated. In some embodiments, channel coefficient estimator 202 (FIG. 1) may calculate one or more sets of channel coefficients from training signals received from a transmitter, such as transmitter 102 (FIG. 1).

In operation 304, a channel rate-of-change ($\delta_0$, $\delta_1$) is calculated from channel coefficients. In some embodiments, channel coefficient estimator 202 (FIG. 2) may calculate the channel rate-of change from the channel coefficients generated in operation 302.

In operation 306, initial soft-symbol outputs ($v_0$, $v_1$) are generated. In some embodiments, combiner 206 (FIG. 2) may generate the initial soft-symbol outputs $v_0$ and $v_1$ from received symbols $r_0$ and $r_1$, the channel rate-of-change $\delta_0$ and $\delta_1$, and the channel coefficients $h_0$ and $h_1$. In some embodiments, the initial soft-symbol outputs $v_0$ and $v_1$ may be generated based substantially on Equations (7) discussed above.

In operation 308, initial hard-symbol outputs ($x_0$, $x_1$) are generated. In some embodiments, initial hard-symbol outputs $x_0$ and $x_1$ may be generated by maximum-likelihood detector 208 (FIG. 2) based on initial soft-symbol outputs $v_0$ and $v_1$) generated in operation 306.

In operation 310, revised soft-symbol outputs ($\theta_0$, $\theta_1$) are generated. In some embodiments, corrector 210 (FIG. 2) may generate revised soft-symbol outputs $\theta_0$ and $\theta_1$ from the initial hard-symbol outputs $x_0$ and $x_1$, the received symbols $r_0$ and $r_1$, the channel rate-of-change $\delta_0$ and $\delta_1$, and the channel coefficients $h_0$ and $h_1$. In some embodiments, revised soft-symbol outputs $\theta_0$ and $\theta_1$ may be generated based on Equations (8) discussed above.

In operation 312, revised hard-symbol outputs ($x_0$, $x_1$) are generated. In some embodiments, the revised hard-symbol outputs $x_0$ and $x_1$ may be generated by maximum-likelihood detector 208 (FIG. 2) based on the revised soft-symbol outputs $\theta_0$ and $\theta_1$ generated in operation 310.

In operation 314, operations 310 and 312 may be repeated to generate revised hard-symbol outputs ($x_0$, $x_1$). In some embodiments, operation 314 is optional. In these embodiments, the revised hard-symbol outputs $x_0$ and $x_1$ may be generated with a single iteration of operations 310 and 312, although the scope of the invention is not limited in this respect.

Upon the completion of operation 312 or 314, final hard-symbol outputs $x_0$ and $x_1$ may be provided by space-time decoder 200 (FIG. 2) for subsequent processing to generate an output-symbol stream that may correspond to the symbol stream encoded by transmitter 102 (FIG. 1). The output symbol stream may be demodulated based on the modulation level to generate an output bit stream which may correspond to the bit stream modulated by transmitter 102 (FIG. 1).

Although the individual operations of procedure 300 are illustrated and described as separate operations, one or more of the individual operations may be performed concurrently, and nothing requires that the operations be performed in the order illustrated.

Referring back to FIG. 1, in some embodiments, transmitter 102 and receiver 106 may communicate OFDM communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some embodiments, transmitter 102 and receiver 106 may communicate in accordance with a multiple access technique, such as orthogonal frequency division multiple access (OFDMA), although the scope of the invention is not limited in this respect. In some other embodiments, transmitter 102 and receiver 106 may communicate using spread-spectrum signals, although the scope of the invention is not limited in this respect.

In some embodiments, transmitter 102 and/or receiver 106 may be part of a communication station, such as wireless local area network (WLAN) communication station including a Wireless Fidelity (WiFi) communication station, an access point (AP) or a mobile station (MS). In some other embodiments, transmitter 102 and/or receiver 106 may be part of a broadband wireless access (BWA) network communication station, such as a Worldwide Interoperability for Microwave Access (WiMax) communication station, although the scope of the invention is not limited in this respect.

In some embodiments, transmitter 102 and/or receiver 106 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals used by transmitter 102 and receiver 106 may comprise either a 5 gigahertz (GHz) frequency spectrum or a 2.4 GHz frequency spectrum. In these embodiments, the 5 gigahertz (GHz) frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, transmitter 102 and receiver 106 may communicate in accordance with specific communication standards, such as the Institute of Electrical and Electronics Engineers (IEEE) standards including IEEE 802.11 (a), 802.11(b), 802.11(g), 802.11(h) and/or 802.11(n) standards and/or proposed specifications for wireless local area networks, although the scope of the invention is not limited in this respect as they may also be suitable to transmit and/or receive communications in accordance with other techniques and standards. In some broadband wireless access network embodiments, transmitter 102 and receiver 106 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. Some embodiments relate to the IEEE 802.11e proposed enhancement to the IEEE 802.11 WLAN specification that will include quality of service (QoS) features, including the prioritization of data, voice, and video transmissions.

Transmit antennas 112 and receive antenna 116 may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna.

In some other embodiments, transmitter 102 and receiver 106 may communicate in accordance with standards such as the Pan-European mobile system standard referred to as the Global System for Mobile Communications (GSM). Transmitter 102 and receiver 106 may also operate in accordance with packet radio services such as the General Packet Radio Service (GPRS) packet data communication service. In some embodiments, transmitter 102 and receiver 106 may communicate in accordance with the Universal Mobile Telephone System (UMTS) for the next generation of GSM, which may, for example, implement communication techniques in accordance with 2.5G and 3G wireless standards (See 3GPP Technical Specification, Version 3.2.0, March 2000), including the 3GPP long-term evolution (LTE). In some of these embodiments, transmitter 102 and receiver 106 may provide packet data services (PDS) utilizing packet data protocols (PDP). In some embodiments, transmitter 102 and receiver 106 may communicate in accordance with other standards or other air-interfaces including interfaces compatible with the enhanced data for GSM evolution (EDGE) standards (see 3GPP Technical Specification, Version 3.2.0, March 2000), although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission, or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate preferred embodiment.

What is claimed is:

1. A space-time decoder comprising;
    a combiner to generate soft-symbol outputs from received symbols, a channel rate-of-change and channel coefficient; and
    a maximum-likelihood detector to perform maximum-likehhood decoding to generate hard-symbol outputs from the soft-symbol outputs,
    wherein the hard-symbol outputs are initial hard-symbol outputs,
    wherein the decoder further comprises a corrector for generating revised soft-symbol outputs from the initial hard-symbol outputs, the received symbols, the channel rate-of-change and the channel coefficients, and
    wherein the maximum-likelihood detector generates final hard-soft-symbol outputs by performing maximum-likelihood decoding on the revised soft-symbol outputs.

2. The decoder of claim 1 wherein the received symbols comprise Alamouti-encoded symbols transmitted by two transmit antennas,
    wherein the combiner and the corrector apply the channel rate-of-change to at least in part, compensate for distortion in a channel caused by high Doppler shift, and
    wherein the final hard-symbol outputs generated by the maximum-likelihood detector are estimates of the transmitted Alamouti-encoded symbols.

3. A space-time decoder comprising:
    a combiner to generate soft-symbol outputs from received symbols, a channel rate-of-change and channel coeffients;
    a maximum-likelihood detector to perform maximum-likelihood decoding to generate hard-symbol outputs soft-symbol outputs; and
    a channel coefficient estimator to calculate the channel coefficients based on training signals transmitted for two or more channels between a transmitter and a receiver, and
    wherein the channel coefficient estimator further calculates the channel rate-of-change from two or more sets of the channel coefficients.

4. The decoder of claim 1 wherein the corrector generates the revised soft-symbol outputs and the maximum-likelihood detector generates interim hard-symbol outputs iteratively prior to generating the final hard-symbol outputs.

5. The decoder of claim 4 further comprising switching circuitry to switch inputs of the maximum-likelihood detector from outputs of the combiner to outputs of the corrector and to switch outputs of the maximum-likelihood detector to inputs of the corrector when the corrector and the maximum-likelihood detector iteratively generate interim hard-symbol outputs.

6. The decoder of claim 2 wherein the received symbols comprise non-equalized received symbols.

7. The decoder of claim 1 wherein the channel rate-of-change comprises a channel rate-of-change for a first channel between a transmitter and a receiver and a channel rate-of-change for a second channel between the transmitter and the receiver,
    wherein the channel coefficients comprise a channel coefficient for the first channel and a channel coefficient for the second channel, wherein the received symbols comprise first and second sequentially received symbols, and wherein the combiner generates a first soft-symbol output based on one plus a complex conjugate of the channel rate-of-change for the first channel times a complex conjugate of the channel coefficient for the first channel times a first received signal.

8. The decoder of claim 7 wherein the combiner generates a second soft-symbol output based on one plus the complex conjugate of the channel rate-of-change for the second channel times the complex conjugate of the channel coefficient for the second channel times the first received signal.

9. The decoder of claim 1 wherein the received symbols are orthogonal frequency division multiplexed frequency-domain signals and are generated by performing a Fourier transform on received time-domain signals.

10. A method for decoding received symbols comprising:
generating soft-symbol outputs from received symbols, a channel rate-of-change and channel coefficients and
performing maximum-likelihood decoding to generate hard-symbol outputs from the soft-symbol outputs,
wherein the hard-symbol outputs are initial hard-symbol outputs,
wherein the method further comprises:
generating revised soft-symbol outputs from the initial hard-symbol outputs, the received symbols, the channel rate-of-change and the channel coefficients; and
generating final hard-symbol outputs by performing maximum-likelihood decoding on the revised soft-symbol outputs.

11. The method of claim 10 wherein the received symbols comprise Alamouti-encoded symbols transmitted by two transmit antennas,
wherein the method further comprises applying the channel rate-of-change to, at least in part, compensate for distortion in a channel caused by high Doppler shift, and
wherein the final hard-symbol outputs comprise estimates of the transmitted Alamouti-encoded symbols.

12. A method for decoding received symbols comprising:
generating soft-symbol outputs from received symbols, a channel rate-of-change and channel coefficients;
performing maximum-likelihood decoding to generate hard-symbol outputs from the soft-symbol outputs; and
calculating the channel coefficients based on training signals transmitted for two or more channels between a transmitter and a receiver; and
calculating the channel rate-of-change from two or more sets of the channel coefficients.

13. The method of claim 10 further comprising generating the revised soft-symbol outputs and interim hard-symbol outputs iteratively prior to generating the final hard-symbol outputs.

14. The method of claim 13 wherein a combiner generates the soft-symbol outputs, a maximum-likelihood detector generates the interim and the final hard-symbol outputs, and a corrector generates the revised soft-symbol outputs, and wherein the method further comprises:
switching inputs of the maximum-likelihood detector from outputs of the combiner to outputs of the corrector; and
switching outputs of the maximum-likelihood detector to inputs of the corrector when the corrector and the maximum-likelihood detector iteratively generates the interim hard-symbol outputs.

15. The method of claim 11 wherein the received symbols comprise non-equalized received symbols.

16. The method of claim 10 wherein the received symbols are orthogonal frequency division multiplexed (OFDM) frequency-domain signals and are generated by performing a Fourier transform on received time-domain signals.

17. A receiver comprising:
a space-time decoder comprising a combiner and a maximum-likelihood detector, the combiner to generate soft-symbol outputs from received symbols, a channel rate-of-change and channel coefficients, the maximum-likelihood detector to perform maximum-likelihood decoding to generate hard-symbol outputs from the soft-symbol outputs; and
one or more antennas to receive signals comprising the received symbols,
wherein the hard-symbol outputs are initial hard-symbol outputs,
wherein the space-time decoder further comprises a corrector for generating revised soft-symbol outputs from the initial hard-symbol outputs, the received symbols, the channel rate-of-change and the channel coefficients, and
wherein the maximum-likelihood detector generates final hard-symbol outputs by performing maximum-likelihood decoding on the revised soft-symbol outputs.

18. The receiver of claim 17 wherein the received symbols comprise Alamouti-encoded symbols transmitted by two transmit antennas,
wherein the combiner and the corrector apply the channel rate-of-change to at least in part, compensate for distortion in a channel caused by high Doppler shift, and
wherein the final hard-symbol outputs generated by the maximum-likelihood detector are estimates of the transmitted Alamouti-encoded symbols.

19. The receiver of claim 17 further comprising a channel coefficient estimator to calculate the channel coefficients based on training signals transmitted for two or more channels between a transmitter and the receiver, and
wherein the channel coefficient estimator further calculates the channel rate-of-change from two or more sets of the channel coefficients.

20. The receiver of claim 17 wherein the corrector generates the revised soft-symbol outputs and the maximum-likelihood detector generates interim hard-symbol outputs iteratively prior to generating the final hard-symbol outputs.

* * * * *

UNITED STATES PATENT AND TRADEMARK OFFICE
CERTIFICATE OF CORRECTION

PATENT NO. : 8,638,885 B2  
APPLICATION NO. : 12/514840  
DATED : January 28, 2014  
INVENTOR(S) : Evseev et al.

It is certified that error appears in the above-identified patent and that said Letters Patent is hereby corrected as shown below:

On the Title Page, Item (56)

In column 2, under "Other Publications", line 2, delete "dated" and insert --mailed--, therefor On page 2, in column 1, under "Other Publications", line 1, delete "K," and insert --K.,--, therefor On page 2, in column 1, under "Other Publications", line 4, delete "Rechnology" and insert --Technology--, therefor On page 2, in column 1, under "Other Publications", line 5, delete "W," and insert --W.,--, therefor On page 2, in column 1, under "Other Publications", line 15, delete "A," and insert --A.,--, therefor On page 2, in column 1, under "Other Publications", line 15, delete "Bassed" and insert --Based--, therefor On page 2, in column 1, under "Other Publications", line 16, delete "Ieee Curcuits" and insert --IEEE Circuits--, therefor In the Claims

In column 10, line 8, in Claim 1, delete "comprising;" and insert --comprising:--, therefor In column 10, line 10-11, in Claim 1, delete "coefficient" and insert --coefficients--, therefor In column 10, line 13, in Claim 1, delete "likehhood" and insert --likelihood--, therefor In column 10, line 22, in Claim 1, delete "hard-soft-symbol" and insert --hard-symbol--, therefor Signed and Sealed this  
Second Day of December, 2014

Michelle K. Lee  
*Deputy Director of the United States Patent and Trademark Office*

CERTIFICATE OF CORRECTION (continued)
U.S. Pat. No. 8,638,885 B2

In column 10, line 35-36, in Claim 3, delete "coeffients;" and insert --coefficients;--, therefor In column 10, line 38, in Claim 3, after "outputs", insert --from the--, therefor In column 10, line 61, in Claim 7, delete "comprises" and insert --comprises:¶--, therefor In column 11, line 17, in Claim 10, delete "comprising;" and insert --comprising:--, therefor In column 11, line 19, in Claim 10, delete "coefficients and" and insert --coefficients; and--, therefor

UNITED STATES PATENT AND TRADEMARK OFFICE
CERTIFICATE OF CORRECTION

PATENT NO. : 8,638,885 B2
APPLICATION NO. : 12/514840
DATED : January 28, 2014
INVENTOR(S) : Evseev et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this
Twelfth Day of May, 2015

Michelle K. Lee
*Director of the United States Patent and Trademark Office*